United States Patent
Li et al.

(10) Patent No.: US 11,354,176 B2
(45) Date of Patent: *Jun. 7, 2022

(54) DATA COMPUTING LOGIC FOR EXECUTION AT A DATA COMPUTING NODE

(71) Applicant: Advanced New Technologies Co., Ltd., Grand Cayman (KY)

(72) Inventors: Hailong Li, Hangzhou (CN); Zhenyu Zhang, Hangzhou (CN); Xueqing Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/162,251

(22) Filed: Jan. 29, 2021

(65) Prior Publication Data

US 2021/0149749 A1 May 20, 2021

Related U.S. Application Data

(63) Continuation of application No. PCT/CN2019/107229, filed on Sep. 23, 2019.

(30) Foreign Application Priority Data

Nov. 23, 2018 (CN) .......................... 201811409663.3

(51) Int. Cl.
*G06F 9/54* (2006.01)
*G06F 16/22* (2019.01)
(Continued)

(52) U.S. Cl.
CPC .......... *G06F 9/542* (2013.01); *G06F 16/2228* (2019.01); *G06F 16/2282* (2019.01);
(Continued)

(58) Field of Classification Search
CPC .. G06F 9/542; G06F 16/2282; G06F 16/2228; G06F 21/602; G06F 21/6218;
(Continued)

(56) References Cited

U.S. PATENT DOCUMENTS

6,606,744 B1 * 8/2003 Mikurak ........... H04L 29/06027
717/174
8,103,527 B1 * 1/2012 Lasalle .................. G06Q 40/08
705/4
(Continued)

FOREIGN PATENT DOCUMENTS

CN 102332143 1/2012
CN 106560853 4/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Jorge A Chu Joy-Davila
(74) *Attorney, Agent, or Firm* — Fish & Richardson P.C.

(57) ABSTRACT

A data processing system includes a first data terminal, a second data terminal, and a data computing node, where the data computing node is separately in communication connection with the first data terminal and the second data terminal. The data computing node is provided with at least one data computing logic. A method for processing data at the data processing system includes: receiving, by the data computing node, a data computing call application sent by the second data terminal, where the data computing call application includes a query index for target service event data, obtaining the target service event data from the first data terminal based on the query index, running a data computing logic corresponding to the data computing call
(Continued)

application, and performing data computing based on the target service event data to obtain a computing result, and sending the computing result to the second data terminal.

20 Claims, 5 Drawing Sheets

(51) Int. Cl.
*G06F 21/60* (2013.01)
*G06F 21/62* (2013.01)
*G06Q 10/10* (2012.01)
*H04L 9/40* (2022.01)

(52) U.S. Cl.
CPC ........ *G06F 21/602* (2013.01); *G06F 21/6218* (2013.01); *G06Q 10/10* (2013.01); *H04L 63/0428* (2013.01)

(58) Field of Classification Search
CPC .. G06Q 10/10; G06Q 10/06; G06Q 10/06316; G06Q 30/0225; G06Q 40/08; H04L 63/0428
See application file for complete search history.

(56) References Cited

U.S. PATENT DOCUMENTS

| | | | | |
|---|---|---|---|---|
| 8,260,634 | B1* | 9/2012 | Lawlor | G06Q 50/18 705/2 |
| 9,390,128 | B1* | 7/2016 | Seetala | G06F 11/3476 |
| 2002/0077869 | A1* | 6/2002 | Doyle | G06Q 40/02 705/4 |
| 2002/0128897 | A1* | 9/2002 | Nelson | G06Q 90/00 707/713 |
| 2007/0260646 | A1* | 11/2007 | Szlam | G06Q 10/087 |
| 2009/0228431 | A1* | 9/2009 | Dunagan | H04L 67/327 |
| 2010/0088125 | A1* | 4/2010 | Vaughan | G06Q 40/08 705/4 |
| 2014/0222493 | A1* | 8/2014 | Mohan | G06Q 10/06316 705/7.26 |
| 2014/0278623 | A1* | 9/2014 | Martinez | G06F 8/36 705/7.12 |
| 2015/0081342 | A1* | 3/2015 | Dawson | G06Q 10/0633 705/4 |
| 2015/0332407 | A1* | 11/2015 | Wilson, II | G07C 5/0808 705/4 |
| 2016/0017532 | A1 | 1/2016 | Jo et al. | |
| 2016/0035044 | A1 | 2/2016 | Xu | |
| 2016/0217532 | A1 | 7/2016 | Slavin | |
| 2016/0246849 | A1* | 8/2016 | Frampton | G06F 16/282 |
| 2017/0344921 | A1* | 11/2017 | Leonelli | H04W 4/50 |
| 2017/0364694 | A1* | 12/2017 | Jacob | G06F 16/24534 |
| 2018/0276626 | A1 | 9/2018 | Laiben | |
| 2018/0285979 | A1 | 10/2018 | Chessell et al. | |
| 2019/0236712 | A1* | 8/2019 | Horowitz | G06Q 40/08 |
| 2021/0183487 | A1* | 6/2021 | Teodoro | G16H 40/63 |

FOREIGN PATENT DOCUMENTS

| | | |
|---|---|---|
| CN | 108446992 | 8/2018 |
| CN | 108600390 | 9/2018 |
| CN | 108629565 | 10/2018 |
| CN | 108694238 | 10/2018 |
| CN | 108776936 | 11/2018 |
| CN | 110019249 | 7/2019 |
| JP | 2018120566 | 8/2018 |
| TW | 201828211 | 8/2018 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2019/107229, dated Dec. 20, 2019, 10 pages (with partial English translation).
PCT International Preliminary Report on Patentability in International Application No. PCT/CN2019/107229, dated May 25, 2021, 11 pages (with English translation).
EP Extended Search Report in European Appln No. 19887186.5, dated Sep. 6, 2021, 8 pages.

* cited by examiner

DATA COMPUTING LOGIC FOR EXECUTION AT A DATA COMPUTING NODE

CROSS-REFERENCE TO RELATED APPLICATIONS

This application is a continuation of PCT Application No. PCT/CN2019/107229, filed on Sep. 23, 2019, which claims priority to Chinese Patent Application No. 201811409663.3, filed on Nov. 23, 2018, and each application is hereby incorporated by reference in its entirety.

TECHNICAL FIELD

The present specification relates to the field of data processing technologies, and in particular, to data processing methods, apparatuses, and computer devices.

BACKGROUND

In the current process of commercial insurance claim settlement, the insured must bring all the policies and service event data (such as medical records, patient cases, etc.) on which the insurance claim settlement is based to the insurance company to submit an application, or manually take a photo and use the insurance company's application (APP) to upload the materials to the claim settlement platform and initiate a claim settlement application. The whole process is inefficient and cumbersome, and it takes many days to get the compensation. Paper documents are difficult to keep and easy to lose, and the process is more cumbersome when reimbursement is needed from multiple insurance companies. In addition, for insurance companies, since the insured personally provides the relevant medical treatment materials, there is a possibility of falsifying the materials, which not only increases the difficulty of reviewing claim settlement materials, but also brings certain risks of insurance fraud.

SUMMARY

In view of the previous description, one or more embodiments of the present specification provide data processing methods, apparatuses, and computer devices.

To achieve the previous objective, one or more embodiments of the present specification provide the following technical solutions:

According to a first aspect of one or more embodiments of the present specification, a data processing method is provided, which is applied to a data processing system including a first data terminal, a second data terminal, and a data computing node; the data computing node is separately in communication connection with the first data terminal and the second data terminal; the data computing node is provided with at least one data computing logic; the method includes the following: receiving, by the data computing node, a data computing call application sent by the second data terminal, where the data computing call application includes a query index for target service event data; obtaining the target service event data from the first data terminal based on the query index; running a data computing logic corresponding to the data computing call application, and performing data computing based on the target service event data to obtain a computing result; and sending the computing result to the second data terminal.

According to a second aspect of one or more embodiments of the present specification, a data processing method is provided, which is applied to a data processing system including a first data terminal, a second data terminal, and a data computing node; the data computing node is separately in communication connection with the first data terminal and the second data terminal; the data computing node is provided with at least one data computing logic; the method includes the following: sending, by the second data terminal, a data computing call application to the data computing node, where the data computing call application includes a query index for target service event data; and receiving a computing result sent by the data computing node, where the computing result is obtained by the data computing node through data computing based on the target service event data and by running the data computing logic; and the target service event data is obtained by the data computing node from the first data terminal based on the query index.

According to a third aspect of one or more embodiments of the present specification, a data processing apparatus is provided, which is applied to a data processing system including a first data terminal, a second data terminal, and a data computing node; the data computing node is separately in communication connection with the first data terminal and the second data terminal; the data computing node is provided with at least one data computing logic; the apparatus includes the following: a receiving unit, configured to receive a data computing call application sent by the second data terminal, where the data computing call application includes a query index for target service event data; an acquisition unit, configured to obtain the target service event data from the first data terminal based on the query index; a computing unit, configured to run a data computing logic corresponding to the data computing call application, and perform data computing based on the target service event data to obtain a computing result; and a sending unit, configured to send the computing result to the second data terminal.

According to a fourth aspect of one or more embodiments of the present specification, a data processing apparatus is provided, which is applied to a data processing system including a first data terminal, a second data terminal, and a data computing node; the data computing node is separately in communication connection with the first data terminal and the second data terminal; the data computing node is provided with at least one data computing logic; the apparatus includes the following: a sending unit, configured to send a data computing call application to the data computing node, where the data computing call application includes a query index for target service event data; and a receiving unit, configured to receive a computing result sent by the data computing node, where the computing result is obtained by the data computing node through data computing based on the target service event data and by running the data computing logic; and the target service event data is obtained by the data computing node from the first data terminal based on the query index.

According to a fifth aspect of one or more embodiments of the present specification, a computer device is provided, including a memory and a processor, where the memory stores a computer program that can be executed by the processor; and the processor executes the computer program to perform the previously described steps of the data processing method performed by the data computing node.

According to a sixth aspect of one or more embodiments of the present specification, a computer device is provided, including a memory and a processor, where the memory stores a computer program that can be executed by the processor; and the processor executes the computer program to perform the previously described steps of the data processing method performed by the second data terminal.

DESCRIPTION OF EMBODIMENTS

Example embodiments are described in detail here, and examples of the example embodiments are presented in the accompanying drawings. When the following description relates to the accompanying drawings, unless specified otherwise, same numbers in different accompanying drawings represent same or similar elements. Example embodiments described in the following do not represent all embodiments consistent with one or more embodiments of the present specification. On the contrary, the embodiments are only examples of apparatuses and methods that are described in the appended claims in detail and consistent with some aspects of one or more embodiments of the present specification.

It is worthwhile to note that the steps of the corresponding method are not necessarily performed in the order shown and described in the present specification in other embodiments. In some other embodiments, the method can include more or less steps than those described in the present specification. In addition, a single step described in the present specification can be decomposed into multiple steps in other embodiments for description; and multiple steps described in the present specification can be combined into a single step for description in other embodiments.

Figure 1:
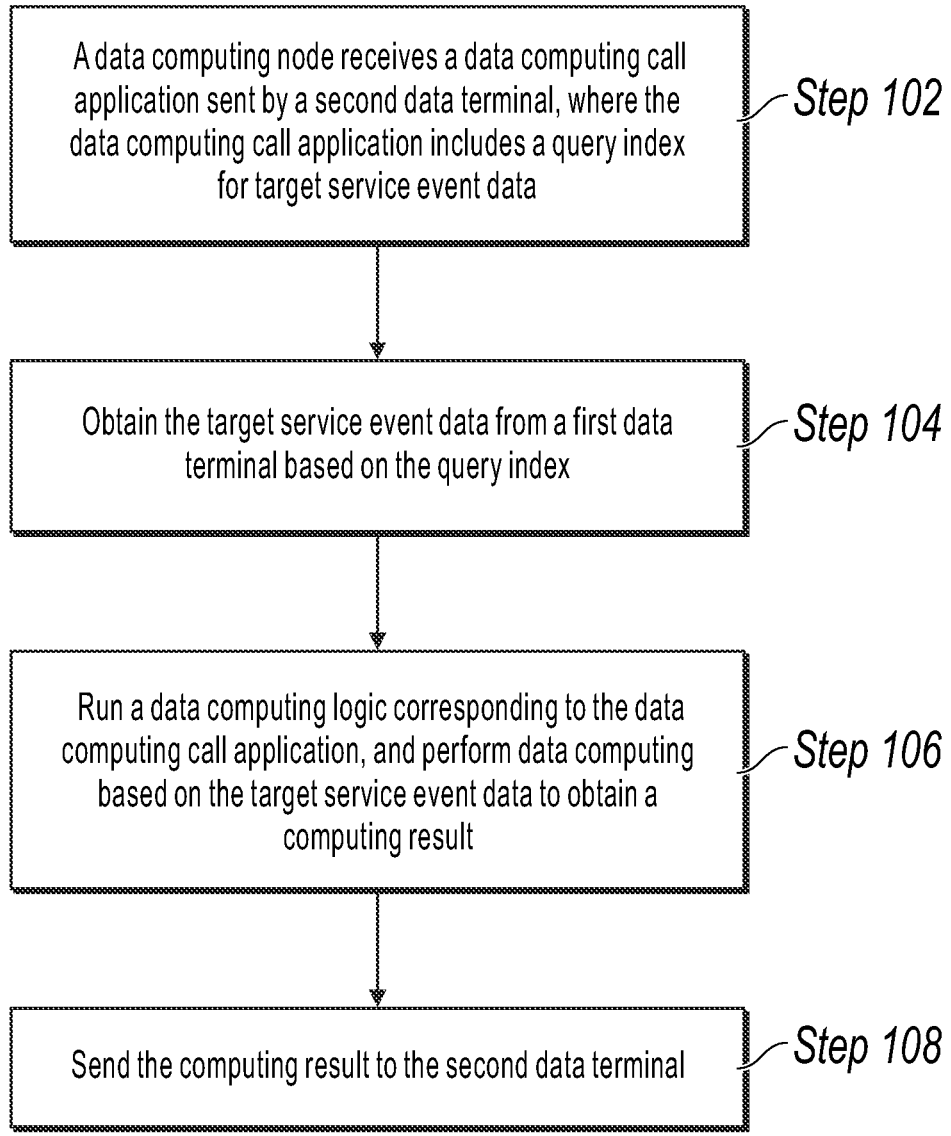
FIG. 1 is a flowchart illustrating a data processing method performed by a data computing node, according to some embodiments of the present specification.

FIG. 1 is a flowchart illustrating a data processing method performed by a data computing node, according to some embodiments of the present specification. The data processing method is applied to a data processing system including a first data terminal, a second data terminal, and a data computing node; the data computing node is separately in communication connection with the first data terminal and the second data terminal; and the data computing node is provided with at least one data computing logic.

The data computing node described in the embodiments is provided with at least one data computing logic. The data computing node can be a data computing functional module belonging to the first data terminal or the second data terminal, or the data computing node can be a data computing terminal device independent of the first data terminal and the second data terminal, which is not limited in the present specification. The data computing node is separately in communication connection with the first data terminal and the second data terminal; and the connection includes, but is not limited to, a local connection, an external connection, etc.

In other illustrated embodiments, the data computing node is connected to the first data terminal in the local communication mode, and the data computing node is connected to the second data terminal in an external communication mode, that is, the data computing node is configured locally at the first data terminal in the form of a data computing functional module or a data computing terminal device. The local communication mode includes but is not limited to communication through a wired connection, communication through a data bus connection in a terminal, communication through a dedicated bus connection, and communication through a local area network; the external communication mode includes but is not limited to communication through an external network, etc.

The data computing node is locally configured in the first data terminal, so that the management organization of the first data terminal can monitor or obtain evidence of output data of the data computing node, thereby preventing the data computing node from transmitting the obtained service event data without authorization, effectively ensuring the security of the service event data, and preventing a data security risk that may arise after the service event data is obtained by other terminals.

The data computing logic in the data computing node can be deployed by the second data terminal based on service needs. When the data computing node is locally configured at the first data terminal for data logic computing due to service needs, if the data computing node is a removable hardware terminal independent of the first data terminal and the second data terminal, the second data terminal can locally deploy the data computing logic in the data computing node, and move the data computing node to the first data terminal after the deployment is completed, so that the data computing node is connected to the first data terminal in the local communication mode; alternatively, the second data terminal can transmit the data computing logic to the data computing node for deployment and installation in the external communication mode.

If the data computing node is a data computing functional module belonging to the first data terminal, the second data terminal generally transmits the data computing logic to the data computing node for deployment and installation in the external communication mode.

Since the second data terminal may often increase types of data computing logic, or update or modify the existing data computing logic at each determined time. A person skilled in the art can be aware that instead of the method for locally configuring the data computing logic in the second data terminal, and installing the data computing node in motion; in comparison, the transmission and deployment of the data computing logics in the data computing node in the external communication mode can flexibly configure, add, or update the data computing logics.

As shown in FIG. 1, the data processing method includes the following steps:

Step 102: The data computing node receives a data computing call application sent by the second data terminal, where the data computing call application includes a query index for target service event data.

In other illustrated embodiments, when the data computing node is provided with multiple data computing logics, the data computing call application further includes a logic identifier corresponding to at least one of the multiple data computing logics, so that the data computing node can easily select the corresponding data computing logic for computing.

Step 104: Obtain the target service event data from the first data terminal based on the query index.

There can be multiple specific methods for the data computing node to obtain target service event data from the first data terminal. For example, the data computing node can send the query index for the target service event data included in the data computing call application to the first data terminal. The target event data is directly obtained from the first data terminal.

In some illustrated embodiments, to ensure the security of all service event data and other data stored in the first data terminal, the first data terminal can provide data authorization to the second data terminal, and transmit an authorized service event data set to the data computing node in the local communication mode, so that the data computing node can quickly obtain the target service event data from the authorized service event data set during data computing. The specific authorization rules for the service event data can be specifically determined according to the agreement between the first data terminal and the second data terminal.

Alternatively, the first data terminal provides data authorization to the second data terminal, which can be implemented in the form of a data index table corresponding to the authorized service event data sent to the data computing node. After receiving the data computing call application, the data computing node performs a search in the authorized service event data index table based on the query index for the target service event data included in the data computing call application. If the query index or the data object that the query index points to is found in the data index table, it indicates that the target service event data is the service event data authorized by the first data terminal. Then, the data computing node obtains the target service event data from the authorized service event data set stored in the first data terminal based on the query index. In the implementation provided in the embodiments in which the data computing node obtains target service event data from the first data terminal, the storage capacity needed by the data computing node to store the authorized service event data is omitted so that the first data terminal has more flexible operability for the service event data.

Step 106: Run a data computing logic corresponding to the data computing call application, and perform data computing based on the target service event data to obtain a computing result.

In some illustrated embodiments, when the data computing logic is transmitted by the second data terminal through encryption in the external communication mode to the data computing node for encrypted deployment, the data computing is encrypted computing based on the target service event data and the encrypted data computing logic; correspondingly, the computing result is an encrypted computing result. In the embodiments, although the data computing node is locally deployed in the first data terminal, the first data terminal can neither decrypt the data computing logic nor decrypt the computing result of the data computing, thereby ensuring the security of the service event data of the first data terminal, and ensuring the privacy and security of the data computing process.

Step 108: Send the computing result to the second data terminal.

In other illustrated embodiments, the data computing logic of the data computing node is transmitted by the second data terminal through encryption in the external communication mode to the data computing node for encrypted deployment; correspondingly, the computing result is an encrypted computing result obtained through encrypted computing based on the target service event data and the encrypted data computing logic. After obtaining the encrypted computing result, the second data terminal can decrypt the computing result.

An insurance claim settlement scenario is used as an example below to describe in detail the data processing method provided in the present specification. The data computing node is a claim settlement computing node, the first data terminal is a service data party's terminal, the second data terminal is a claim settlement service party's terminal, the computing logic is a claim settlement computing logic, the data computing call application is a claim settlement computing call application, and the computing result is a claim settlement result.

Figure 2:
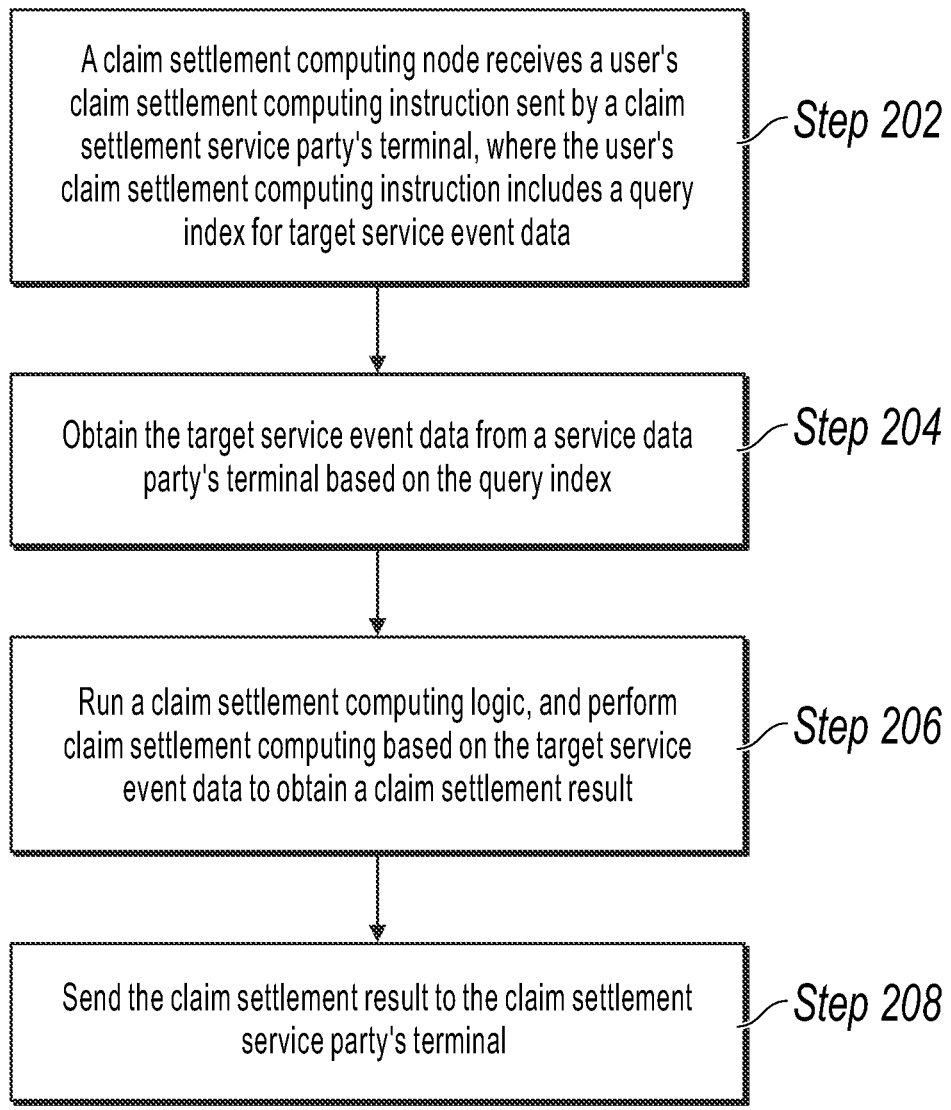
FIG. 2 is a flowchart illustrating an insurance claim settlement method performed by a claim settlement computing node, according to some embodiments of the present specification.

FIG. 2 is a flowchart illustrating an insurance claim settlement method performed by a claim settlement computing node, according to some example embodiments. The method is applied to an insurance claim settlement system including a service data party's terminal, a claim settlement service party's terminal, and a claim settlement computing node. The claim settlement computing node is separately in communication connection with the service data party's terminal and the claim settlement service party's terminal. The claim settlement computing node is provided with claim settlement computing logics.

The claim settlement service party's terminal described in the embodiments is a terminal device that can interact with a user for the claim settlement service, receive the user's claim settlement application, and provide a claim settlement result for the user. It can include servers of independent insurance companies, a server corresponding to the claim settlement service platform uniformly set up by multiple insurance companies, etc.

The service data party's terminal described in the embodiments can be a terminal device that stores service event data on which claim settlement is based. For example, when the user's claim settlement application is a medical insurance claim settlement application, the corresponding service data party's terminal is a terminal device that stores the user's medical event data, for example, data servers of institutions such as general hospitals, specialized clinics, and personalized medical service (such as genetic testing and physical examination) companies; when the user's claim settlement application is a vehicle insurance claim settlement application, the corresponding service event data party's terminal is a terminal device that stores records of vehicle maintenance, customization, refitting, etc. With the development of the insurance service, more and more events or the states of events are included in the scope of insurance or claim settlement, and the corresponding service data storage terminals can all belong to the service data party's terminal described in the embodiments.

The claim settlement computing node described in the embodiments is provided with claim settlement computing logics. The claim settlement computing node can be a claim settlement computing functional module belonging to the claim settlement service party's terminal or the service data party's terminal, or the claim settlement computing node can be a claim settlement computing terminal device independent of the claim settlement service party's terminal and the service data party's terminal, which is not limited in the present specification. The claim settlement computing node is separately in communication connection with the service data party's terminal and the claim settlement service party's terminal; and the connection includes, but is not limited to, a local connection, an external connection, etc.

In other illustrated embodiments, the claim settlement computing node is connected to the service data party's terminal in the local communication mode, and the claim settlement computing node is connected to the claim settlement service party's terminal in an external communication mode, that is, the claim settlement computing node is configured locally in the service data party's terminal in the form of a claim settlement computing functional module or a claim settlement computing terminal device. The local communication mode includes but is not limited to communication through a wired connection, communication through a data bus connection in a terminal, communication through a dedicated bus connection, and communication through a local area network; the external communication mode includes but is not limited to communication through an external network, etc.

The claim settlement computing node is locally configured in the service data party's terminal, so that the management organization of the service data party's terminal can monitor or obtain evidence of output data of the claim settlement computing node, thereby preventing the claim settlement computing node from transmitting the obtained service event data without authorization, effectively ensuring the use security of the service event data, and preventing data security risks that may arise after the service event data is obtained by the claim settlement service party's terminal.

The claim settlement computing logic deployed in the claim settlement computing node is usually formulated based on the claim settlement rules stipulated in the insurance product contract that the user purchases or in which the user is the beneficiary. Therefore, the formulation or deployment party of the claim settlement computing logic is usually a terminal device corresponding to an insurance claim settlement service organization, or the claim settlement service party's terminal described in the embodiments.

When the claim settlement computing node needs to be locally configured in the service data party's terminal for claim settlement logic computing, if the claim settlement computing node is a removable hardware terminal independent of the service data party's terminal and the claim settlement service party's terminal, the claim settlement service party's terminal can deploy the claim settlement computing logic in the claim settlement computing node at the insurance claim settlement service organization (and the claim settlement service party's terminal) according to the insurance claim settlement rules corresponding to the user, and move the claim settlement computing node to the service data party's terminal after the deployment is completed, so that the claim settlement computing node is connected to the service data party's terminal in the local communication mode; alternatively, the claim settlement service party's terminal can transmit the claim settlement computing logic to the claim settlement computing node for deployment and installation in the external communication mode.

If the claim settlement computing node is a claim settlement computing functional module belonging to the service data party's terminal, the claim settlement service party's terminal generally transmits the claim settlement computing logic to the claim settlement computing node for deployment and installation in the external communication mode.

Since the claim settlement service party can usually provide a variety of different categories and different levels of claim settlement services based on different categories and different insurance levels of insurance products, the claim settlement service party can often increase type of claim settlement computing logic, or update or modify the existing claim settlement computing logic at each determined time. A person skilled in the art can be aware that instead of the method for locally configuring the claim settlement computing logic in the claim settlement service party's terminal, and installing the claim settlement computing node in motion; in comparison, the transmission and deployment of the claim settlement computing logics in the claim settlement computing node in the external communication mode can flexibly configure, add, or update the claim settlement computing logics.

Moreover, since the claim settlement computing logic generated according to the insurance claim settlement rules corresponding to the user is usually related to the service secrets or trade secrets of the insurance claim settlement service party, the claim settlement computing logic can alternatively be transmitted through encryption by the claim settlement service party's terminal in the external communication mode to the claim settlement computing node for encrypted deployment. As such, even if the claim settlement computing node is located at the service data party's terminal, the service data party cannot understand the confidential content such as the specific rule settings of the claim settlement computing logic, thereby protecting the trade secrets of the insurance claim settlement service party.

As shown in FIG. 2, an insurance claim settlement method performed by a claim settlement computing node in some embodiments includes the following steps:

Step 202: The claim settlement computing node receives a claim settlement computing call application sent by the claim settlement service party's terminal, where the claim settlement computing call application includes a query index for target service event data.

The claim settlement service party's terminal described in the embodiments can obtain the user's claim settlement application by interacting with the user. Since the claim settlement service method provided in the embodiments does not require the user to provide the service event data on which the claim settlement is based, the claim settlement computing call application generated based on the user's claim settlement application can include obtaining a query index for target service event data, which is the service event data on which the claim settlement of the user is based. For example, the target service event data is the medical record data of user Tom in Hospital A on Nov. 20, 2018, then the query index for the target service event data included in the claim settlement computing call application is Tom's medical identity information (name or ID card number or medical card number) and medical treatment date information, etc. The specific form and content of the query index can be specifically determined according to the method for storing the service event data by the claim settlement computing node or the service data party's terminal, which is not limited in the present specification. Certainly, the claim settlement computing call application described in the embodiments can be generated based on the user's claim settlement application, or directly generated by the claim settlement service party's terminal, which is not limited in the present specification.

In other illustrated embodiments, when the claim settlement computing node is provided with multiple claim settlement computing logics, the claim settlement computing call application further includes a logic identifier corresponding to at least one of the multiple claim settlement computing logics, so that the claim settlement computing node can easily select the corresponding claim settlement computing logic for computing.

Step 204: Obtain the target service event data from the service data party's terminal based on the query index.

There can be multiple specific methods for the claim settlement computing node to obtain target service event data from the service data party's terminal. For example, the claim settlement computing node can send the query index for the target service event data included in the claim settlement computing call application to the service data party's terminal. The target event data is directly obtained from the service data party's terminal.

In some illustrated embodiments, to ensure the security of all service event data and other data stored in the service data party's terminal, the service data party's terminal can provide data authorization to the claim settlement service party, and transmit an authorized service event data set to the claim settlement computing node in the local communication mode, so that the claim settlement computing node can quickly obtain the target service event data from the authorized service event data set during claim settlement computing. The specific authorization rules for service event data can be specifically determined according to the agreement between the service data party and the claim settlement service party. For example, the claim settlement service party's terminal can send the insured user list to the service data party, and the service data party's terminal sorts out the service event data set corresponding to the insured users based on the insured user list.

Alternatively, the service data party's terminal provides data authorization to the claim settlement service party, which can be implemented in the form of a data index table corresponding to the authorized service event data sent to the claim settlement computing node. After receiving the claim settlement computing instruction, the claim settlement computing node performs search in the authorized service event data index table based on the query index for the target service event data included in the claim settlement computing instruction. If the query index or the data object that the query index points to is found in the data index table, it indicates that the target service event data is the service event data authorized by the service data party's terminal. Then, the claim settlement service party obtains the target service event data from the authorized service event data set stored in the service data party's terminal based on the query index. In the implementation provided in the embodiments in which the claim settlement computing node obtains target service event data from the service data party's terminal, the storage capacity needed by the claim settlement computing node to store the authorized service event data is omitted so that the service data party's terminal has more flexible operability for the service event data.

Step 206: Run the claim settlement computing logic, and perform claim settlement computing based on the target service event data to obtain a claim settlement result.

In some illustrated embodiments, when the claim settlement computing logic is transmitted by the claim settlement service party's terminal through encryption in the external communication mode to the claim settlement computing node for encrypted deployment, the claim settlement computing is encrypted computing based on the target service event data and the encrypted claim settlement computing logic; correspondingly, the claim settlement result is an encrypted claim settlement result. In the embodiments, although the claim settlement computing node is locally deployed in the service data party's terminal, the service data party's terminal can neither decrypt the claim settlement computing logic nor decrypt the claim settlement result of the claim settlement computing, thereby ensuring the security of the service event data of the service data party's terminal, and ensuring the privacy and security of the claim settlement computing process.

In other illustrated embodiments, when the claim settlement computing node is provided with multiple claim settlement computing logics, as described in some embodiments, the claim settlement computing call application further includes a logic identifier corresponding to at least one of the multiple claim settlement computing logics; correspondingly, the running of the claim settlement computing logic, and performing of claim settlement computing based on the target service event data to obtain a claim settlement result includes the following: obtaining at least one claim settlement computing logic corresponding to the claim settlement computing call application based on the logic identifier; running the at least one claim settlement computing logic, and performing claim settlement computing based on the target service event data to obtain at least one claim settlement computing result.

The previous embodiments are particularly suitable for the scenario in which the same user has purchased multiple insurance products, and claim settlement for the multiple insurance products can be based on the same target service event data; the claim settlement computing logics corresponding to the multiple insurance products can be deployed by the same claim settlement service party's terminal or by different claim settlement service party's terminals, which is not limited in the present specification.

Step 208: Send the claim settlement result to the claim settlement service party's terminal.

After running the claim settlement computing logic corresponding to the claim settlement computing call application, the claim settlement computing node sends the obtained claim settlement result to the claim settlement service party's terminal.

In some illustrated embodiments, the claim settlement computing node is installed locally in the service data party's terminal, and the claim settlement computing node is connected to the claim settlement service party's terminal in an external communication mode, to remotely transmit the claim settlement result to the claim settlement service party's terminal.

In other illustrated embodiments, the claim settlement computing logic of the claim settlement computing node is transmitted by the claim settlement service party's terminal through encryption in the external communication mode to the claim settlement computing node for encrypted deployment; correspondingly, the claim settlement result is an encrypted claim settlement result obtained through encrypted computing based on the target service event data and the encrypted claim settlement computing logic. After obtaining the encrypted claim settlement result, the claim settlement service party can decrypt the claim settlement result and send the decrypted claim settlement result to the terminal device on the user side.

The claim settlement result described in the previous embodiments can include a notification for the specific execution content (including whether to carry out claim settlement, the limit of the claim settlement amount, the payment period of the claim settlement amount, etc.) of the claim settlement plan, or a payment instruction for directly paying the claim settlement amount to the user, etc. Correspondingly, after obtaining the claim settlement result, the claim settlement service party's terminal can send the notification for the specific execution content of the claim settlement plan to the terminal device on the user side, or directly transfer the claim settlement amount to the account of the user (or another insurance claim settlement beneficiary).

Figure 3:
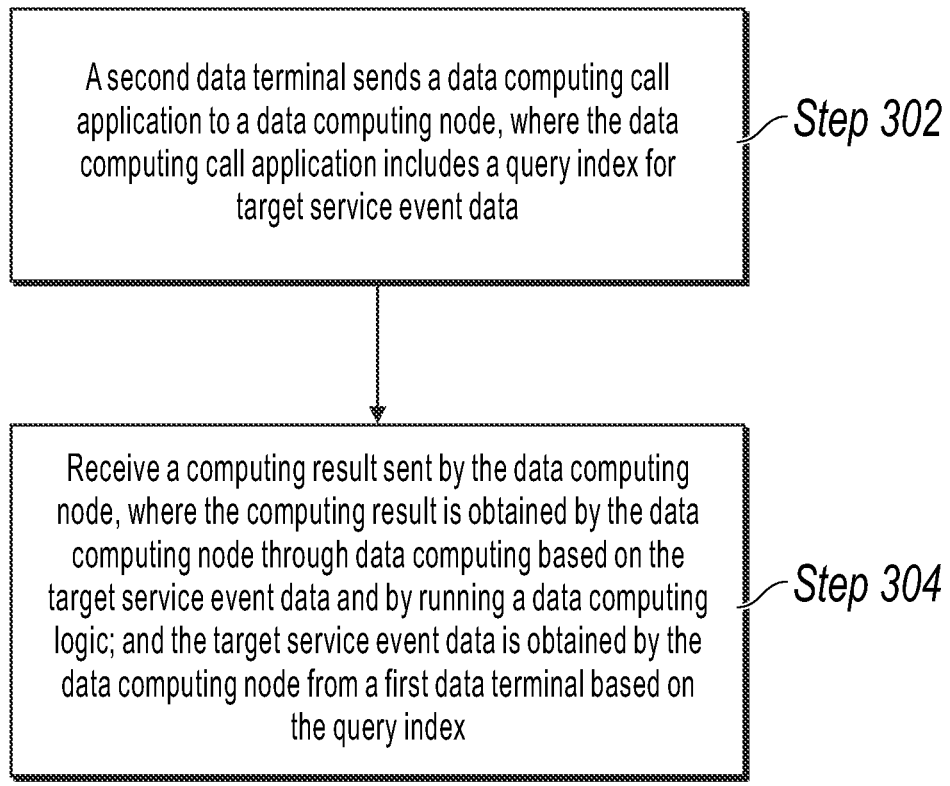
FIG. 3 is a flowchart illustrating a data processing method performed by a second data terminal, according to some embodiments of the present specification.

Correspondingly, the present specification further provides a data processing method performed by a second data terminal; the method is applied to a data processing system including a first data terminal, a second data terminal, and a data computing node; the data computing node is separately in communication connection with the first data terminal and the second data terminal; the data computing node is provided with at least one data computing logic; and as shown in FIG. 3, the method includes the following steps:

Step 302: The second data terminal sends a data computing call application to the data computing node, where the data computing call application includes a query index for target service event data.

Step 304: Receive a computing result sent by the data computing node, where the computing result is obtained by the data computing node through data computing based on the target service event data and by running the data computing logic; and the target service event data is obtained by the data computing node from the first data terminal based on the query index.

In other illustrated embodiments, the data computing node is connected to the first data terminal in the local communication mode, and the data computing node is connected to the second data terminal in an external communication mode.

In other illustrated embodiments, the data computing logic is transmitted by the second data terminal in the external communication mode to the data computing node for deployment.

In other illustrated embodiments, the data computing logic is transmitted by the second data terminal through encryption in the external communication mode to the data computing node for encrypted deployment; the computing result is an encrypted computing result obtained by the data computing node by running the encrypted data computing logic and by performing data computing based on the target service event data.

In other illustrated embodiments, the data computing node is provided with multiple data computing logics, and the data computing call application further includes a logic identifier corresponding to at least one of the multiple data computing logics.

Similarly, the previous data processing method is applied to the insurance claim settlement scenario. The data processing method is an insurance claim settlement data processing method, the data computing node is a claim settlement computing node, the first data terminal is a service data party's terminal, the second data terminal is a claim settlement service party's terminal, the computing logic is a claim settlement computing logic, the data computing call application is a claim settlement computing call application, and the computing result is a claim settlement result.

The functions and roles of each terminal involved in the data processing method performed by the second data terminal or the claim settlement service party's terminal described in each of the previous embodiments are similar to those of each terminal involved in the data processing method performed by the data computing node or the claim settlement computing node described in one or more of the previous embodiments in the present specification. Details are omitted here for simplicity.

Figure 6:
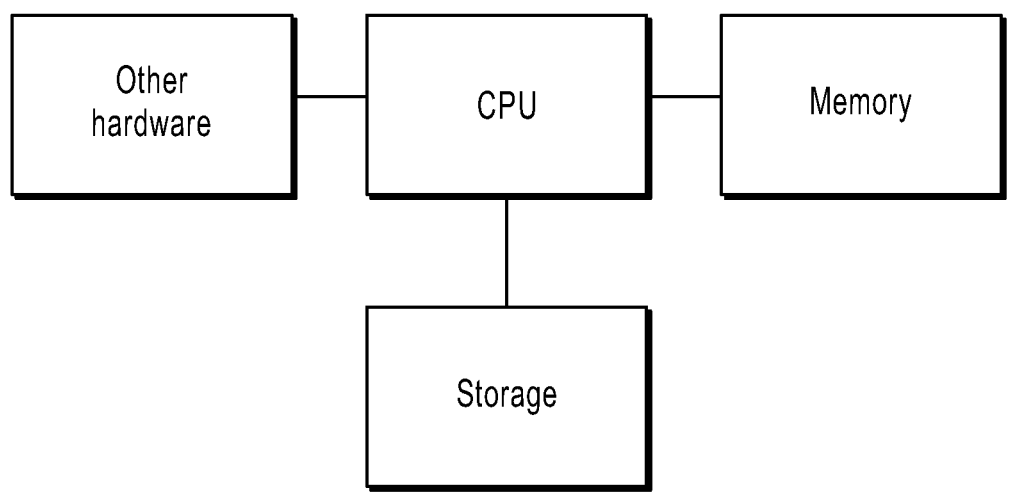
FIG. 6 is a diagram illustrating a hardware structure for running a blockchain-based claim settlement apparatus, according to some embodiments of the present specification.

Corresponding to the previous process implementation, some embodiments of the present specification further provide a data processing apparatus. The apparatus can be implemented by software, or can be implemented by hardware or a combination of software and hardware. For example, the apparatus is implemented by software. A logical apparatus is formed when a central processing unit (CPU) of a device in which the apparatus is located reads a corresponding computer program instruction into the memory for running. In terms of hardware, in addition to the CPU, storage, and memory shown in FIG. 6, a device in which an apparatus for implementing a network risk service is located generally further includes other hardware such as a chip for transmitting and receiving wireless signals, and/or other hardware such as a board for implementing network communication functions.

Figure 4:
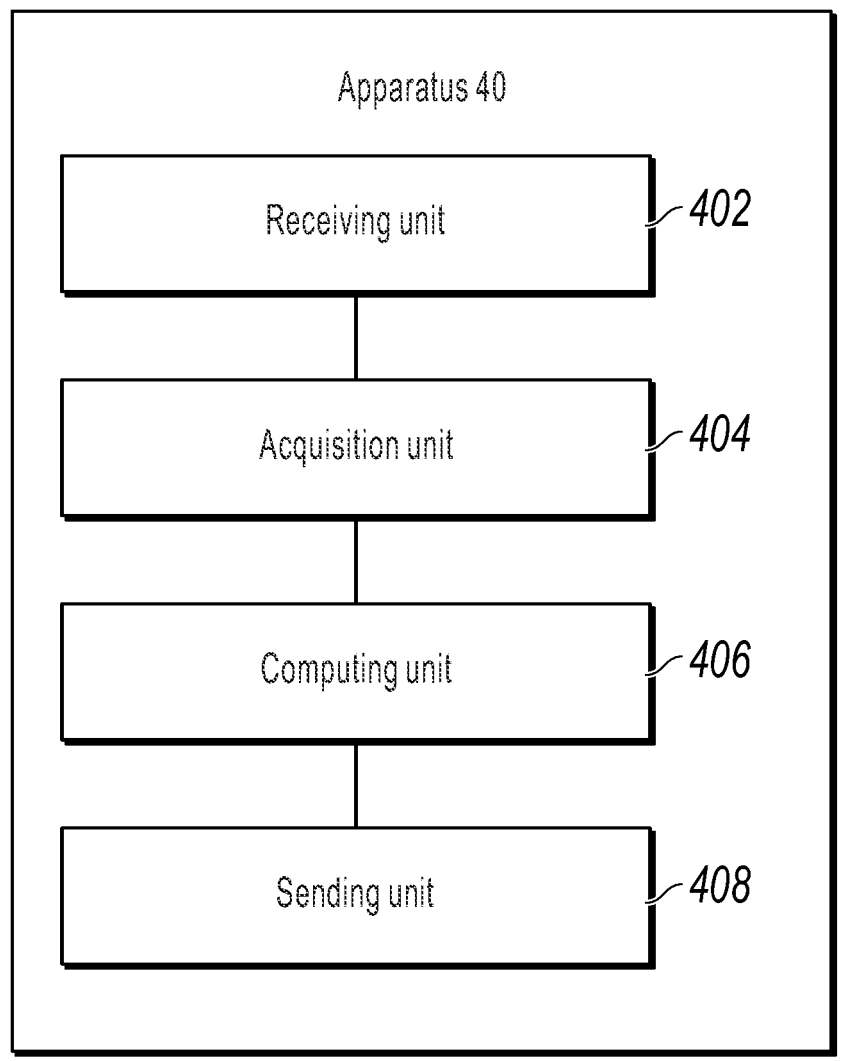
FIG. 4 is a schematic diagram illustrating an insurance claim settlement apparatus, according to some embodiments of the present specification.

FIG. 4 shows a data processing apparatus 40, which is applied to a data processing system including a first data terminal, a second data terminal, and a data computing node; the data computing node is separately in communication connection with the first data terminal and the second data terminal; the data computing node is provided with at least one data computing logic; and the apparatus 40 includes the following: a receiving unit 402, configured to receive a data computing call application sent by the second data terminal, where the data computing call application includes a query index for target service event data; an acquisition unit 404, configured to obtain the target service event data from the first data terminal based on the query index; a computing unit 406, configured to run a data computing logic corresponding to the data computing call application, and perform data computing based on the target service event data to obtain a computing result; and a sending unit 408, configured to send the computing result to the second data terminal.

In other illustrated embodiments, the data computing node is connected to the first data terminal in the local communication mode, and the data computing node is connected to the second data terminal in an external communication mode.

In other illustrated embodiments, the data computing logic is transmitted by the second data terminal in the external communication mode to the data computing node for deployment.

In other illustrated embodiments, the data computing logic is transmitted by the second data terminal through encryption in the external communication mode to the data computing node for encrypted deployment; and the computing unit 406 is configured to: run an encrypted data computing logic corresponding to the data computing call application, and perform encrypted data computing based on the target service event data to obtain an encrypted computing result.

In other illustrated embodiments, the data computing call application further includes a logic identifier corresponding to the at least one data computing logic.

In other illustrated embodiments, the data computing node stores a service event data set authorized by the first data terminal; the service event data set is transmitted by the first data terminal to the data computing node in the local communication mode; and the acquisition unit 404 is configured to: obtain, based on the query index, the target service event data from the service event data set stored in the data computing node.

In other illustrated embodiments, the data computing node stores a data index table corresponding to the service event data set authorized by the first data terminal; and the acquisition unit 404 is configured to: determine, based on the query index and the data index table, whether the target service event data belongs to a service event data set authorized by the first data terminal; and if yes, obtain, based on the query index, the target service event data from the service event data set stored in the first data terminal.

In other illustrated embodiments, the data processing apparatus is an insurance claim settlement data processing apparatus, the data computing node is a claim settlement computing node, the first data terminal is a service data party's terminal, the second data terminal is a claim settlement service party's terminal, the computing logic is a claim settlement computing logic, the data computing call application is a claim settlement computing call application, and the computing result is a claim settlement result.

Figure 5:
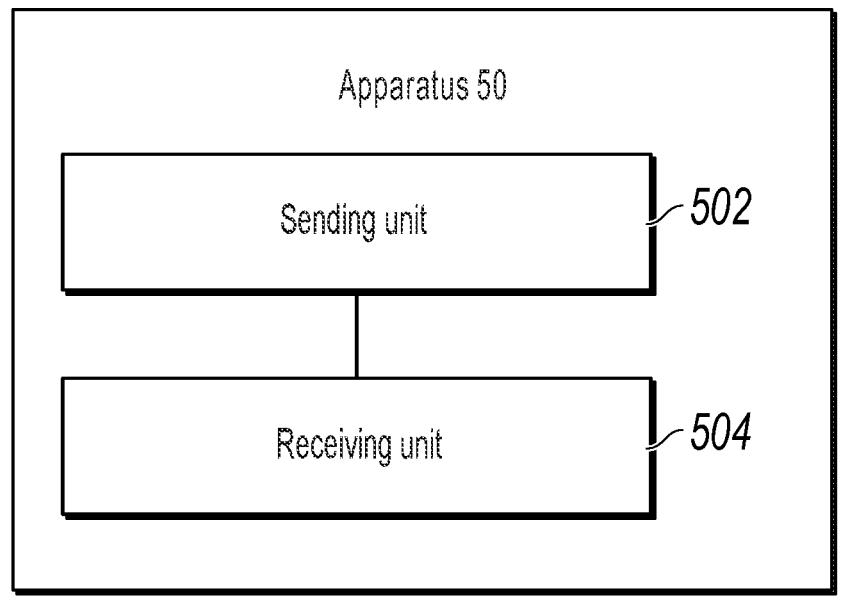
FIG. 5 is a schematic diagram illustrating an insurance claim settlement apparatus, according to some embodiments of the present specification.

As shown in FIG. 5, the present specification further provides a data processing apparatus 50, which is applied to a data processing system including a first data terminal, a second data terminal, and a data computing node; the data computing node is separately in communication connection with the first data terminal and the second data terminal; the data computing node is provided with at least one data computing logic; and the apparatus includes the following: a sending unit 502, configured to send a data computing call application to the data computing node, where the data computing call application includes a query index for target service event data; and a receiving unit 504, configured to receive a computing result sent by the data computing node, where the computing result is obtained by the data computing node through data computing based on the target service event data and by running the data computing logic; and the target service event data is obtained by the data computing node from the first data terminal based on the query index.

In other illustrated embodiments, the data computing node is connected to the first data terminal in the local communication mode, and the data computing node is connected to the second data terminal in an external communication mode.

In other illustrated embodiments, the data computing logic is transmitted by the second data terminal in the external communication mode to the data computing node for deployment.

In other illustrated embodiments, the data computing logic is transmitted by the second data terminal through encryption in the external communication mode to the data computing node for encrypted deployment; and the computing result is an encrypted computing result obtained by the data computing node by running the encrypted data computing logic and by performing data computing based on the target service event data.

In other illustrated embodiments, the data computing node is provided with multiple data computing logics, and the data computing call application further includes a logic identifier corresponding to at least one of the multiple data computing logics.

In other illustrated embodiments, the data processing method is an insurance claim settlement data processing method, the data computing node is a claim settlement computing node, the first data terminal is a service data party's terminal, the second data terminal is a claim settlement service party's terminal, the computing logic is a claim settlement computing logic, the data computing call application is a claim settlement computing call application, and the computing result is a claim settlement result.

For an implementation process of functions and roles of each unit in the apparatus, references can be made to an implementation process of corresponding steps in the previous method. For related parts, references can be made to related descriptions in the method embodiments, and details are omitted here for simplicity.

The previously described apparatus embodiments are merely examples. The units described as separate parts can or cannot be physically separate, and parts displayed as units can or cannot be physical modules, can be located in one position, or can be distributed on multiple network modules. Some or all of the units or modules can be selected depending on actual needs to achieve the objectives of the solutions of the present specification. A person of ordinary skill in the art can understand and implement the embodiments of the present specification without creative efforts.

The apparatus, unit, or module illustrated in the previous embodiments can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the previous method embodiments, the embodiments of the present specification further provide a computer device. The computer device includes a memory and a processor. The memory stores a computer program that can be executed by the processor. The processor executes the stored computer program to perform the steps of the data processing method performed by the data computing node in the embodiments of the present specification. For detailed descriptions of the steps of the data processing method performed by the data computing node, references can be made to the previous content, and details are omitted here for simplicity.

Corresponding to the previous method embodiments, the embodiments of the present specification further provide a computer device. The computer device includes a memory and a processor. The memory stores a computer program that can be executed by the processor. The processor executes the stored computer program to perform the steps of the data processing method performed by the second data terminal in the embodiments of the present specification. For detailed descriptions of the steps of the data processing method performed by the second data terminal, references can be made to the previous content, and details are omitted here for simplicity.

The previous descriptions are merely example embodiments of the present specification, but are not intended to limit the present specification. Any modification, equivalent replacement, or improvement made without departing from the spirit and principle of the present specification shall fall within the protection scope of the present specification.

In a typical configuration, a computing device includes one or more processors (CPUs), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data.

Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that the embodiments of the present specification can be provided as a method, a system, or a computer program product. Therefore, the embodiments of the present specification can use a form of hardware only embodiments, software only embodiments, or embodiments with a combination of software and hardware. Moreover, the embodiments of the present specification can use a form of a computer program product that is implemented on one or more computer-usable storage media (including but not limited to a disk memory, a CD-ROM, an optical memory, etc.) that include computer-usable program code.

What is claimed is:

1. A computer-implemented method, comprising:
   receiving, by a data computing node, a data computing call application from a second data terminal, wherein the data computing call application comprises a query index for target service event data, the query index being formatted according to a storage method for storing service event data;
   receiving, by the data computing node, encrypted data computing logic from the second data terminal;
   obtaining, by the data computing node, the target service event data from a first data terminal based on pointers of the query index, an existence of the target service event data in a data index table indicating that the target service event data is service event data authorized by the first data terminal;
   running, by the data computing node, the encrypted data computing logic corresponding to the data computing call application, the encrypted data computing logic comprising one or more rules for execution on the target service event data, wherein the data computing node is locally deployed in the first data terminal;
   obtaining, by the data computing node, an encrypted computing result by performing data computing based on the target service event data, wherein the encrypted data computing logic and the encrypted computing result remain encrypted to the first data terminal;
   obtaining, by the first data terminal, evidence of output of the data computing node; and
   sending, by the data computing node, the encrypted computing result to a second data terminal, the data computing call application having been sent by the second data terminal.

2. The computer-implemented method of claim 1, wherein:
   the data computing node is connected to the first data terminal in a local communication mode; and
   the data computing node is connected to the second data terminal in an external communication mode.

3. The computer-implemented method of claim 2, wherein at least one data computing instruction is transmitted by the second data terminal in the external communication mode to the data computing node for deployment.

4. The computer-implemented method of claim 3, wherein:
   the encrypted data computing logic is transmitted by the second data terminal through encryption in the external communication mode to the data computing node for encrypted deployment; and
   running, by the data computing node, encrypted data computing logic corresponding to the data computing call application, and obtaining a computing result by performing data computing based on the target service event data comprises:
      running encrypted data computing logic corresponding to the data computing call application; and
      performing encrypted data computing logic based on the target service event data to obtain an encrypted computing result.

5. The computer-implemented method of claim 1, wherein the data computing call application further comprises a logic identifier corresponding to at least one encrypted data computing logic.

6. The computer-implemented method of claim 2, wherein:
   the data computing node stores a service event data set authorized by the first data terminal;
   the service event data is transmitted by the first data terminal to the data computing node in the local communication mode; and
   obtaining the target service event data from the first data terminal based on the query index comprises:
      obtaining, based on the query index, the target service event data from the service event data set stored in the data computing node.

7. The computer-implemented method of claim 2, wherein:
   the data computing node stores a data index table corresponding to a service event data set authorized by the first data terminal; and
   obtaining the target service event data from the first data terminal based on the query index comprises:
      determining, based on the query index and the data index table, that the target service event data belongs to a service event data set authorized by the first data terminal; and
      obtaining, based on the query index, the target service event data from the service event data set stored in the first data terminal.

8. A non-transitory, computer-readable medium storing one or more instructions executable by a computer system to perform operations comprising:
   receiving, by a data computing node, a data computing call application from a second data terminal, wherein the data computing call application comprises a query index for target service event data, the query index being formatted according to a storage method for storing service event data;
   receiving, by the data computing node, encrypted data computing logic from the second data terminal;
   obtaining, by the data computing node, the target service event data from a first data terminal based on pointers of the query index, an existence of the target service event data in a data index table indicating that the target service event data is service event data authorized by the first data terminal;
   running, by the data computing node, the encrypted data computing logic corresponding to the data computing call application, the encrypted data computing logic comprising one or more rules for execution on the target service event data, wherein the data computing node is locally deployed in the first data terminal;
   obtaining, by the data computing node, an encrypted computing result by performing data computing based on the target service event data, wherein the encrypted data computing logic and the encrypted computing result remain encrypted to the first data terminal;
   obtaining, by the first data terminal, evidence of output of the data computing node; and
   sending, by the data computing node, the encrypted computing result to a second data terminal, the data computing call application having been sent by the second data terminal.

9. The non-transitory, computer-readable medium of claim 8, wherein at least one data computing instruction is transmitted by the second data terminal in an external communication mode to the data computing node for deployment.

10. The non-transitory, computer-readable medium of claim 9, wherein:
   the encrypted data computing logic is transmitted by the second data terminal through encryption in the external communication mode to the data computing node for encrypted deployment; and
   running encrypted data computing logic corresponding to the data computing call application, and obtaining an encrypted computing result by performing data computing based on the target service event data comprises:
      running encrypted data computing logic corresponding to the data computing call application; and
      performing encrypted data computing logic based on the target service event data to obtain an encrypted computing result.

11. The non-transitory, computer-readable medium of claim 8, wherein the data computing call application further comprises a logic identifier corresponding to a at least one encrypted data computing logic.

12. The non-transitory, computer-readable medium of claim 8, wherein:
   the data computing node stores a service event data set authorized by the first data terminal;
   the service event data is transmitted by the first data terminal to the data computing node in a local communication mode; and
   obtaining the target service event data from the first data terminal based on the query index comprises:
      obtaining, based on the query index, the target service event data from the service event data set stored in the data computing node.

13. The non-transitory, computer-readable medium of claim 8, wherein:
   the data computing node stores a data index table corresponding to a service event data set authorized by the first data terminal; and
   obtaining the target service event data from the first data terminal based on the query index comprises:
      determining, based on the query index and the data index table, that the target service event data belongs to a service event data set authorized by the first data terminal; and
      obtaining, based on the query index, the target service event data from the service event data set stored in the first data terminal.

14. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving, by a data computing node, a data computing call application from a second data terminal, wherein the data computing call application comprises a query index for target service event data, the query index being formatted according to a storage method for storing service event data;
      receiving, by the data computing node, encrypted data computing logic from the second data terminal;
      obtaining, by the data computing node, the target service event data from a first data terminal based on pointers of the query index, an existence of the target service event data in a data index table indicating that the target service event data is service event data authorized by the first data terminal;
      running, by the data computing node, the encrypted data computing logic corresponding to the data computing call application, the encrypted data computing logic comprising one or more rules for execution on the target service event data, wherein the data computing node is locally deployed in the first data terminal;
      obtaining, by the data computing node, an encrypted computing result by performing data computing based on the target service event data, wherein the encrypted data computing logic and the encrypted computing result remain encrypted to the first data terminal;
      obtaining, by the first data terminal, evidence of output of the data computing node; and
      sending, by the data computing node, the encrypted computing result to a second data terminal, the data computing call application having been sent by the second data terminal.

15. The computer-implemented system of claim 14, wherein:
   the data computing node is connected to the first data terminal in a local communication mode; and
   the data computing node is connected to the second data terminal in an external communication mode.

16. The computer-implemented system of claim 15, wherein at least one data computing instruction is transmitted by the second data terminal in the external communication mode to the data computing node for deployment.

17. The computer-implemented system of claim 16, wherein:
- the encrypted data computing logic is transmitted by the second data terminal through encryption in the external communication mode to the data computing node for encrypted deployment; and
- running encrypted data computing logic corresponding to the data computing call application, and obtaining an encrypted computing result by performing data computing based on the target service event data comprises:
  - running encrypted data computing logic corresponding to the data computing call application; and
  - performing encrypted data computing logic based on the target service event data to obtain an encrypted computing result.

18. The computer-implemented system of claim 14, wherein the data computing call application further comprises a logic identifier corresponding to a at least one encrypted data computing logic.

19. The computer-implemented system of claim 15, wherein:
- the data computing node stores a service event data set authorized by the first data terminal;
- the service event data is transmitted by the first data terminal to the data computing node in the local communication mode; and
- obtaining the target service event data from the first data terminal based on the query index comprises:
  - obtaining, based on the query index, the target service event data from the service event data set stored in the data computing node.

20. The computer-implemented system of claim 15, wherein:
- the data computing node stores a data index table corresponding to a service event data set authorized by the first data terminal; and
- obtaining the target service event data from the first data terminal based on the query index comprises:
  - determining, based on the query index and the data index table, that the target service event data belongs to a service event data set authorized by the first data terminal; and
  - obtaining, based on the query index, the target service event data from the service event data set stored in the first data terminal.

* * * * *